United States Patent
Lehnert

[15] 3,657,809
[45] Apr. 25, 1972

[54] PROCESS FOR MAKING THIN METAL TUBING

[72] Inventor: Gunther Lehnert, Hannover-Bothfeld, Germany

[73] Assignee: Kabel-und Metallwerke Gutehoffnungshutte Aktiengesellschaft, Hannover, Germany

[22] Filed: Sept. 13, 1968

[21] Appl. No.: 759,617

[30] Foreign Application Priority Data

Sept. 14, 1967 Germany...........................K 63,355

[52] U.S. Cl.....................29/624, 29/202.5, 29/460, 29/474.1, 29/477.7, 174/102, 174/107, 219/67
[51] Int. Cl. ........................B23p 3/00, B23p 19/04
[58] Field of Search............29/460, 477, 624, 473.9, 202.5, 29/474.1; 174/102, 107; 219/67 X, 8.5

[56] References Cited

UNITED STATES PATENTS

| | | |
|---|---|---|
| 1,794,902 | 3/1931 | Johnson...........................29/624 UX |
| 2,156,934 | 5/1939 | Barrett...............................29/202.5 |
| 2,697,769 | 12/1954 | Carpenter............................219/8.5 |
| 2,697,772 | 12/1954 | Kinghorn..........................174/102 X |
| 2,797,288 | 6/1957 | Kiemele et al......................219/8.5 X |
| 3,011,933 | 12/1961 | Barnes et al. .....................174/102 X |
| 3,095,643 | 7/1963 | Cooke et al.......................29/474.1 X |
| 3,332,138 | 7/1967 | Garner...............................29/624 X |

FOREIGN PATENTS OR APPLICATIONS 910,072 3/1954 Germany.............................29/624

Primary Examiner—Charlie T. Moon
Attorney—Philip G. Hilbert

[57] ABSTRACT

A process for making thin metal tubing as a sheath for electrical cable or as a conduit, wherein very thin metal foil is continuously converted into tubular sheathing as over an electrical cable core, the longitudinal edges of the foil being overlapped and welded, with the immediate application thereafter of a thermoplastic copolymer coating which is tightly adherent to the metal surface of the sheathing, the composite metal foil-plastic tubing having substantially increased mechanical strength.

8 Claims, 2 Drawing Figures

PATENTED APR 25 1972　　3,657,809

INVENTOR.
Gunther Lehnert
BY
Philip S. Hillers
ATTORNEY

PROCESS FOR MAKING THIN METAL TUBING

BACKGROUND OF THE INVENTION

Tubing formed of thin metal tape having a longitudinal seam has been commonly formed by resistance welding of the seam as well as by inductive heating of the tape edges followed by arc welding. However, when the metal tape is very thin, with a thickness of less than 0.2 mm, it is extremely difficult to form a butt seam between the tape edges, since guiding the tape edges with any degree of precision is quite difficult. Further, there is insufficient metal thickness to allow for a flawless welded seam. Also, tubing having thin walls are usually of small diameter which the introduction of a supporting mandrel quite difficult.

Accordingly, an object of this invention is to provide an improved process for converting metal tape which is very thin, into tubular form with an overlap joint which is welded under a protective gas atmosphere and is further treated to increase the mechanical strength of the tubing.

Another object of this invention is to provide a process of the character described, wherein the thin metal foil is converted to tubular form over an electric cable core to form a sheathing therefor; the longitudinal edges of the foil being overlapped and welded to provide a gas-impervious seam; the freshly seamed tubing having an extruded plastic covering applied to the outer surface thereof in tightly adhering relation thereto.

Still another object of this invention is to form thin metal tape having a thickness of 0.2 mm or less into tubular sheath form for a cable core or as a conduit, wherein the tape is continuously converted into tubular form with an overlap longitudinal joint which is welded to form a gas impervious seam; a covering of olefinic copolymer being immediately extruded over the freshly formed tubing to provide a tightly adherent coating, to thereby greatly increase the mechanical strength of the tubing. Further, a supplemental plastic jacket may be extruded over the said coating, where the jacket material does not readily adhere to metal but will adhere to the coating.

Other objects of this invention will in part be obvious and in part hereinafter pointed out.

DESCRIPTION OF THE PREFERRED EMBODIMENTS

Figure 1:
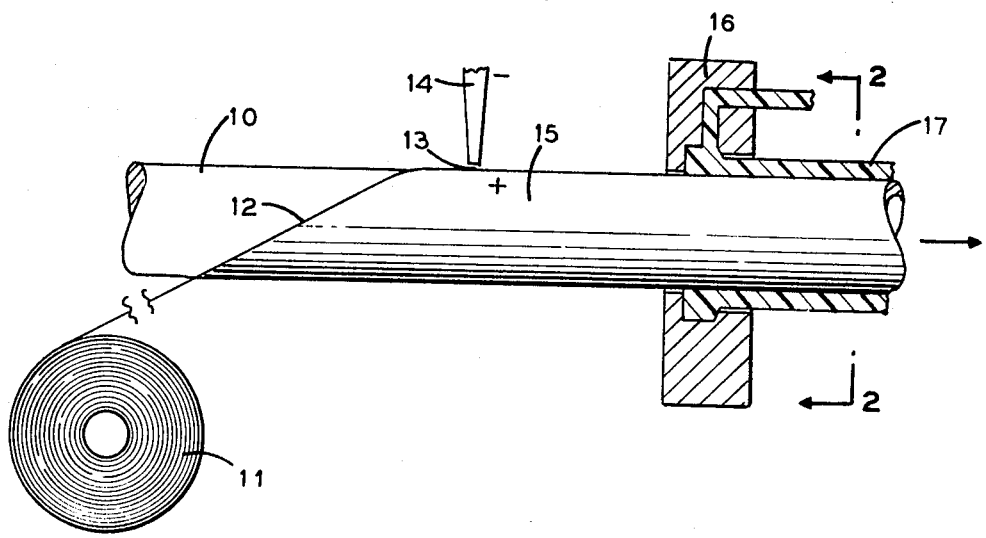
FIG. 1 is a side elevational view, with parts in section, showing the formation of the metal sheathing in accordance with the instant invention.

As shown in FIG. 1, the process of the instant invention is set forth as providing an electrical cable 10 with a very thin metal sheath. To this end, the cable core 10 moving in the direction indicated by the arrow, is enclosed by a metal tape 12 taken from a supply reel 11. The tape 12 is folded about core 10, forming an overlap longitudinal seam, by means, well known in the art.

Figure 2:
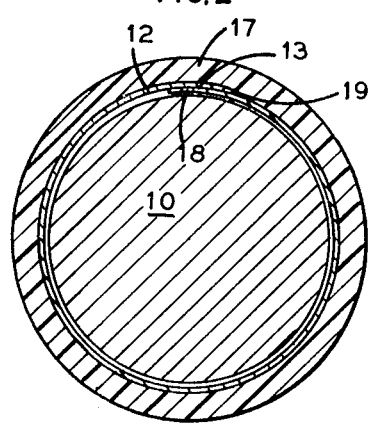
FIG. 2 is a transverse sectional view taken on the line 2—2 of FIG. 1.

The overlap seam is continuously welded at a station 13 by means of the usual welding electrode 14, to form a gas impervious seam. The thus formed sheathing 15 immediately thereafter passes through an extrusion head 16 which is associated with a plastic extrusion device, not shown, to form a covering 17 which envelopes the sheathing 15. The overlapped longitudinal edge portions of metal foil 12, are indicated at 18, 19 in FIG. 2.

The metal foil 12 may be of copper, aluminum or the like, and has a thickness not exceeding about 0.2 mm and is preferably in the range of 0.1 mm and 0.05 mm. and may be as little as 0.005 mm. Such thin foils exhibit very little mechanical strength, particularly when converted to tubular form.

It has been found that the application of plastic covering 17 to the freshly formed tubing, increases the mechanical strength of the tubing substantially. It is understood that such tubing may be formed to provide conduit, in which case a mandrel is used to form such conduit, in lieu of cable core 10. Such conduit may be wound on reels without adversely affecting the tubular wall of the same.

The covering 17 may have a thickness varying between about 0.1 mm and about 1.0 mm. Thus, the covering 17 may have extruded thereover an abrasion resisting jacket of polyethylene in which case the covering 17 may be quite thin, whereas if the jacket is omitted, covering 17 may be somewhat thicker. The covering 17 is derived from a thermoplastic resin such as a polyethylene copolymer having monomeric additives to form a plastic which is very adherent to metal, see U.S. Pat. No. 3,360,409. Other plastics having good adherence to metal, known in the art, may also be used.

The welding of the overlap seam in sheathing 15 may take place under conditions wherein the metal foil is slightly spaced from the core 10, thus providing an insulating air layer separating the hot welding zone from he core surface. Also, the metal of foil 12 is usually effective to conduct the welding heat away from the seam portion at a rate to prevent injury to core 10. However, in the case of heat sensitive cores, a paper tape may be disposed under the welded joint areas as a heat insulator.

I claim:

1. A process for forming a tubular body from a smooth metal tape having a thickness not exceeding 0.2 mm comprising moving the tape in a given path while folding said tape into tubular form with the longitudinal edges of said tape in overlapped relation, continuously electrically welding the overlapped edges of the tape to form a gas impervious seam, and immediately thereafter applying a hot stiffening coating of thermoplastic copolymer which is tightly adherent to metal.

2. A process as in claim 1 wherein the copolymer is a polyethylene copolymer having monomer additives.

3. A process as in claim 1 wherein the copolymer coating is applied to the tubular body by extrusion.

4. A process as in claim 1 wherein said metal tape has a thickness ranging from 0.005 mm to 0.1 mm.

5. A process as in claim 1 wherein said metal tape has a thickness ranging from about 0.05 mm to 0.1 mm.

6. A process as in claim 1 wherein said tape is folded about an electrical cable core.

7. A process as in claim 1 wherein said tape is copper.

8. A process as in claim 6 wherein a paper tape is passed continuously between said cable core and said tape in the welding area thereof.

* * * * *